United States Patent [19]
Kono et al.

[11] Patent Number: 5,777,450
[45] Date of Patent: Jul. 7, 1998

[54] METHOD AND APPARATUS FOR CONTROL IN POWER FAILURE

[75] Inventors: Shinichi Kono; Shigeki Hanyu, both of Minamitsuru-gun, Japan

[73] Assignee: Fanuc Ltd., Yamanashi, Japan

[21] Appl. No.: 704,601

[22] PCT Filed: Feb. 8, 1996

[86] PCT No.: PCT/JP96/00309

§ 371 Date: Sep. 17, 1996

§ 102(e) Date: Sep. 17, 1996

[87] PCT Pub. No.: WO96/26471

PCT Pub. Date: Aug. 29, 1996

[30] Foreign Application Priority Data

Feb. 12, 1995 [JP] Japan .................. 7-32072

[51] Int. Cl.$^6$ .................. H02P 3/26; G05B 19/18; G05D 13/00
[52] U.S. Cl. .................. 318/568.11; 318/570; 318/571; 318/758; 364/475; 51/165.71; 51/165.77; 51/165.88
[58] Field of Search .................. 318/560–696; 364/474.01–474.37, 273.4, 475, 167; 51/165.71, 289 R, 165.77, 165.88, 105 SP; 187/105–109, 119

[56] References Cited

U.S. PATENT DOCUMENTS

| | | | |
|---|---|---|---|
| 4,107,654 | 8/1978 | Nishijima | 318/569 |
| 4,263,535 | 4/1981 | Jones | 318/87 |
| 4,445,167 | 4/1984 | Okado . | |
| 4,484,287 | 11/1984 | Gamo et al. | 364/184 |
| 4,490,946 | 1/1985 | Tsujiuchi et al. | 51/165.88 |
| 4,584,796 | 4/1986 | Yoneda et al. | 51/165.71 |
| 4,639,653 | 1/1987 | Anderson et al. | 318/599 |
| 4,678,980 | 7/1987 | Sugimoto et al. | 318/759 |
| 4,709,509 | 12/1987 | Yoneda et al. | 51/165.71 |
| 4,714,999 | 12/1987 | Kiya et al. | 364/167 |
| 5,012,406 | 4/1991 | Martin | 364/273.4 |
| 5,070,290 | 12/1991 | Iwasa et al. | 318/758 |
| 5,319,292 | 6/1994 | Backstrand | 318/371 |

FOREIGN PATENT DOCUMENTS

| | | |
|---|---|---|
| 2576818 | 8/1986 | France . |
| 60-202065 | 10/1985 | Japan . |
| 61-199483 | 9/1986 | Japan . |
| 4-271288 | 9/1992 | Japan . |
| 5-324027 | 12/1993 | Japan . |
| 6-289914 | 10/1994 | Japan . |
| WO 94 21030 A | 9/1994 | WIPO . |

*Primary Examiner*—Paul Ip
*Attorney, Agent, or Firm*—Staas & Halsey

[57] ABSTRACT

A method and apparatus for controlling, in power failure, such a machine that a workpiece and a tool are required to be always synchronized in their motion. The method and apparatus allow the tool and workpiece to move back and stop at a safe area without causing any damage to them when the main power source is lost. When a power failure has happened in the middle of a synchronous operation of the motors (S1), a power regeneration function is first disabled (S2). Then a braking control command is issued so as to decelerate the tool drive motor and the workpiece drive motor while maintaining their synchronization (S3). In this step S3, the deceleration rate is controlled so that the motors regenerates energy just enough for driving the tool feed motor. The tool retracts back to an area where it is no longer engaged with the workpiece, by driving the tool feed motor with the regenerative energy produced by the deceleration of the tool drive motor and the workpiece drive motor (S4).

9 Claims, 6 Drawing Sheets

METHOD AND APPARATUS FOR CONTROL IN POWER FAILURE

TECHNICAL FIELD

The present invention relates to a method and apparatus for control in power failure, and more specifically, to a method and apparatus for control in power failure in such machines that a workpiece and a tool are required to move always in synchronization with each other as in gear cutting machines including hobbing machines and gear grinding machines.

BACKGROUND ART

Numerically controlled machine tools cut and shape a workpiece as desired by numerically controlling relative motion of the workpiece and tool. Some types among those machines require the workpiece and tool to be always synchronized with each other during the machining operations. A hobbing machine for gear cutting is a typical example of such machines.

FIG. 6 is a perspective view showing the concept of hobbing. The reference numerals 1 and 2 indicate a workpiece and a tool for cutting the workpiece, respectively. The workpiece 1 is rotated by a servo motor for workpiece drive and its rotation speed is thereby regulated, while a spindle motor for tool drive controls the rotation speed of the tool 2 keeping itself synchronized with the servo motor for workpiece drive. The distance between the workpiece 1 and tool 2 is controlled by another servo motor for tool feed; the tool 2 may approach to the workpiece 1 or retract therefrom.

The tool 2 is a gear cutting tool called "hob," which has a thread and several flutes (cutter flutes) running across the thread, thus providing many cutting edges along the trace of the thread. The tool 2 must be positioned in such a way that the trace of its cutting edges will coincide with the tooth trace of the workpiece 1 that is subject to hobbing. By rotating the tool 2, the cutting edges will cut into the workpiece 1 one after another. Since the cutting edges are distributed along the thread trace, the points of engagement will move forward in the axial direction of the tool 2 as it rotates. Therefore, by rotating the workpiece 1 in synchronization with that movement of the engagement points, the teeth are gradually shaped on the workpiece 1 from the addendum to the bottom. In this way, the gear cutting operation is achieved by the tool's rotation synchronized with the workpiece's rotation. After completion of the gear cutting, the tool 2 retracts from the location for engagement with the workpiece 1, driven by the servo motor for tool feed.

However, in case that a power failure has happened in the middle of a machining process, the above-described hobbing machine will encounter a problem described below. Upon power failure, both the spindle motor rotating the tool and the servo motor rotating the workpiece will slow down and stop due to the loss of electric power to the amplifiers which have controlled their rotation. In such a situation, the two motors will stop by themselves independently, in spite of being under the rotation control of the numerical control (NC). It simply means that the behavior of the spindle motor for tool drive and that of the motor for workpiece drive become asynchronous with each other until they completely stop. As such, the conventional control has no means to maintain the synchronous operation when a power failure has happened, thus causing damage to the workpiece or tool in some cases.

To solve the above problem in the case of a power failure that may happen in the middle of a machining process, the applicant of the present invention proposed a technique to retract a tool promptly from a workpiece while maintaining their synchronization. According to this proposed technique, which is disclosed in Japanese Patent Laid-open Publication No. 6-185716 (1994), the energy regenerated from a tool drive and workpiece drive motors during their deceleration is used to drive a tool feed motor in order to carry the tool away from the workpiece.

As such, this prior-art control method hastens to decelerate the tool drive motor and workpiece drive motor when the main power source is interrupted, thereby producing the regenerative energy enough to drive the motor for tool feed. The produced energy, if still remains, will be further dissipated in a discharge resistor unit. It should be noted here that the conventional control method requires a discharge resistor unit to discharge such excess energy that remains unused because the energy regenerated during the deceleration process may not be used up only in the tool feed motor. For this reason, the machines must be equipped with a discharge resistor unit, although it is not used in normal situations, and it will result in their increased costs.

DISCLOSURE OF THE INVENTION

Taking the above into consideration, an object of the present invention is to provide a control method in power failure which permits a workpiece and a tool to stop without causing any damage to them and without using a discharge resistor unit, thus being applicable to such machines that require the workpiece and tool be always synchronized with each other.

To accomplish the above object, according to the present invention, there is provided a method of controlling, in a power failure, a machine in which a tool and a workpiece are numerically controlled in synchronization with each other. The method comprises the steps of: disabling, in response to detection of a power failure, a power regeneration function in a power regeneration circuit disposed between a main power source and amplifiers for driving a tool drive motor, a workpiece drive motor, and a tool feed motor; issuing a braking control command to decelerate the tool drive motor and the workpiece drive motor while maintaining synchronization thereof, the braking control command being produced by a numerical control whose power source is backed up with an uninterruptible power supply system; and retracting the tool to an area where the tool is not engaged with the workpiece, by driving the tool feed motor with regenerative energy produced by deceleration of the tool drive motor and the workpiece drive motor.

According to the above-described method, the regenerative energy produced by deceleration of the tool drive motor and workpiece drive motor will be spent as the energy required for driving the tool feed motor to retract the tool to a safe area where it is not engaged with the workpiece. The deceleration of the tool drive motor and workpiece drive motor is controlled so that it will generate a minimum energy that is enough to drive the tool feed motor.

BEST MODE FOR CARRYING OUT THE INVENTION

An embodiment of the present invention will be described below with reference to the drawings.

Figure 1:
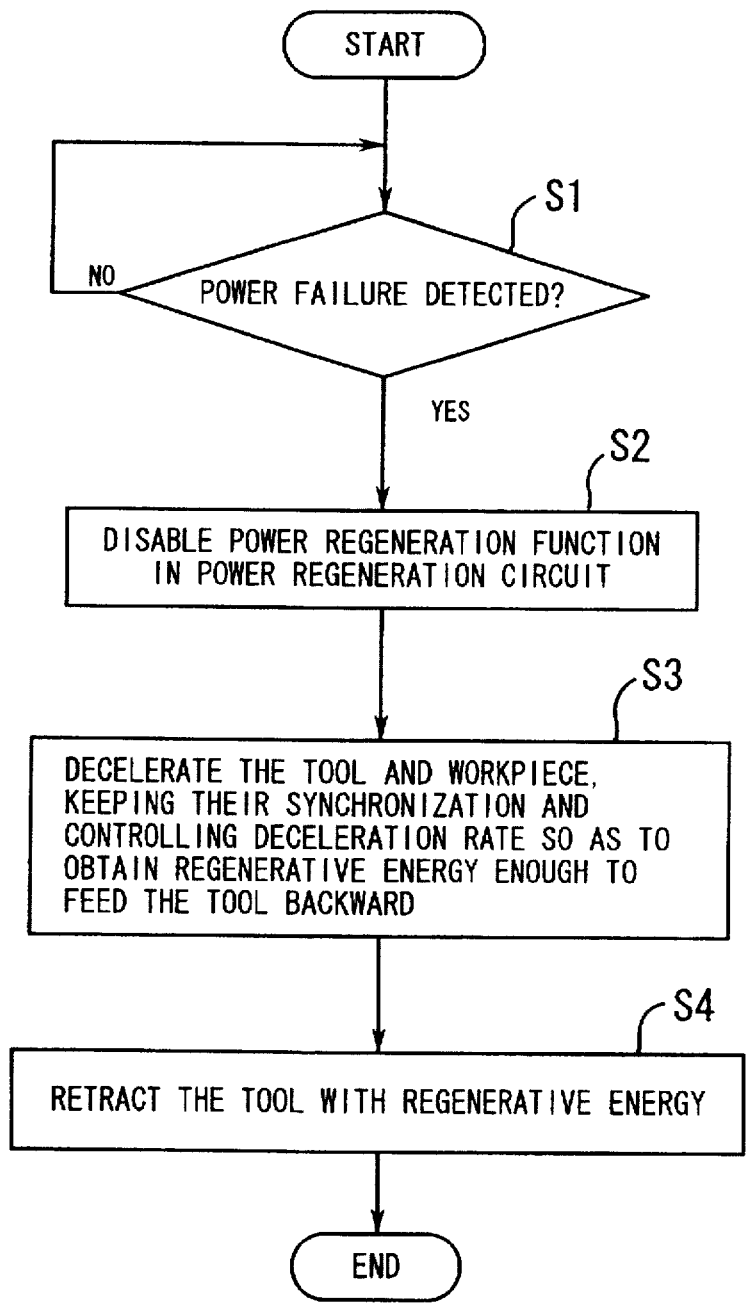
FIG. 1 is a flowchart showing a control method in power failure according to the present invention.

FIG. 1 is a flowchart showing a control method in power failure according to the present invention. As seen in this flowchart, the control method of the present invention provides control necessary for handling a power failure in the following steps. First, it is monitored whether the main power source has failed or not in a machine where a workpiece and a tool are numerically controlled always in synchronization with each other (Step S1).

If a power failure is detected in step S1, a power regeneration function will be disabled (Step S2). This power regeneration function is implemented in a power regeneration circuit, which also supplies electric power to amplifiers to energize three motors for tool drive, workpiece drive, and tool feed. By disabling the function in this step, the regenerative power will not return to the main power source that is currently failed.

Then, the numerical control issues a braking command to slow down the tool drive and workpiece drive motors (Step S3). Besides maintaining the synchronization between the two motors, the braking command controls the deceleration rate so that the tool drive and workpiece drive motors will produce the regenerative energy necessary to drive the tool feed motor. To ensure those control operations in power failure, the numerical control is backed up by an uninterruptible power supply system.

Lastly, all the regenerative energy, which is produced by decelerating the motors for tool drive and workpiece drive, is reused as a power source for the tool feed motor, thus retracting the tool to a safe area where it will no longer engage with the workpiece (Step S4).

Figure 2:
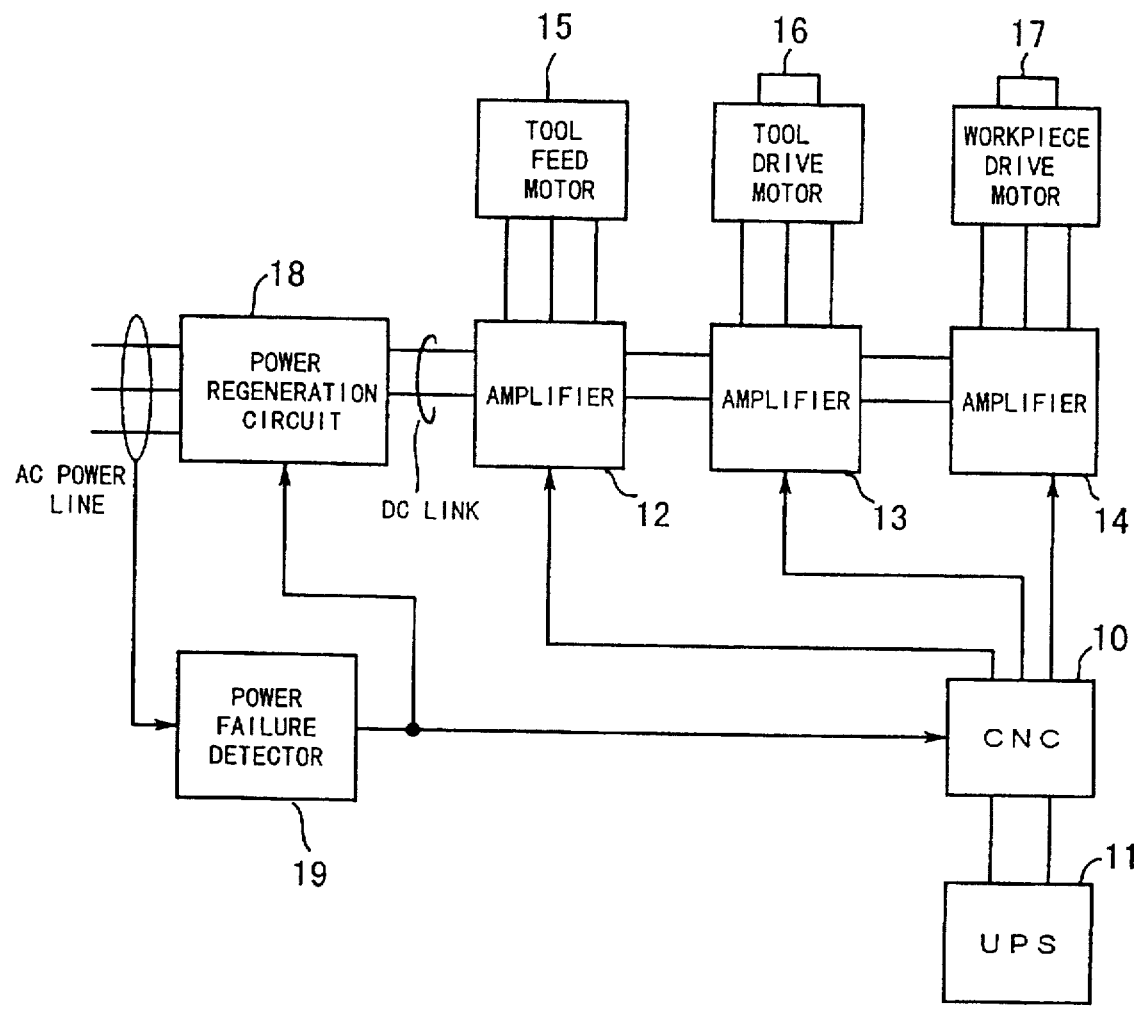
FIG. 2 is a block diagram showing an apparatus for providing control in power failure according to the present invention.

FIG. 2 is a block diagram showing an apparatus for providing necessary control in power failure according to the present invention. A unit identified by a reference numeral 10 in this FIG. 2 is a computerized numerical control (CNC) designed to control gear cutting machines such as a hobbing machine. The power source for the CNC 10 is backed up by an uninterruptible power supply (UPS) 11, so that the CNC 10 will be able to continue its operation for a while even when its main power source is lost. Control commands from the CNC 10 are directed to amplifiers 12, 13 and 14, and power outputs of those amplifiers 12, 13 and 14 are supplied to a tool feed motor 15, a tool drive motor 16 and a workpiece drive motor 17, respectively.

A commercial three-phase AC power line is connected to AC-side terminals of a power regeneration circuit 18, while a DC link containing a capacitor (not shown) is connected to DC-side terminals thereof. This DC link is connected to the amplifiers 12, 13, and 14 in parallel. A power failure detector 19 receives a voltage from the AC power line, and its output signal is delivered to the power regeneration circuit 18 and the CNC 10.

When the AC power line is in a normal condition and the numerically controlled gear cutting machine is properly operating, the CNC 10 controls the tool drive motor 16 and workpiece drive motor 17, keeping them synchronized with each other. The CNC 10 also controls the tool feed motor 15 to feed the tool forward to a workpiece at the beginning of each gear cutting cycle and to move the tool away from the finished workpiece at the end of each cycle. During such normal control operations, the tool feed motor 15, tool drive motor 16, and workpiece drive motor 17 are driven by the amplifiers 12, 13, and 14, which are supplied with electric power from the power regeneration circuit 18. When those running motors are decelerated, the regenerative energy that comes out therefrom will return to the AC power line via the amplifiers 12, 13, and 14 and the power regeneration circuit 18.

If the AC power line failed in the middle of a gear cutting process, the power failure detector 19 detects it and outputs a power failure detection signal. Upon reception of this power failure detection signal, the power regeneration circuit 18 disables the above-described power regeneration function, or the inverter function, to prevent the regenerative power from returning from the DC link to the AC power line. On the other hand, the CNC 10 commands the amplifiers 13 and 14, in response to the power failure detection signal, to decelerate and stop the tool drive motor 16 and workpiece drive motor 17 without loosing their mutual synchronization, and at the same time, it also commands the amplifier 12 for the tool feed motor 15 to retract the tool back to a safe area. It should be noted here that the deceleration condition for the tool drive motor 16 and workpiece drive motor 17 is determined so that the regenerative energy will be equal to the energy necessary for driving the tool feed motor 15. The regenerative energy output from the motors 16 and 17 during their deceleration is brought back to the DC link via the amplifiers 13 and 14 which are now working as converters. The entire energy recharged in the DC link will be used as the power source for the tool feed motor 15 in order to release the tool from engagement with the workpiece.

As described above, the tool drive motor 16 and workpiece drive motor 17 are controlled to decelerate in such a way that they will regenerate only a minimum energy required for driving the tool feed motor 15. The details of this braking control method will be described with reference to the following three examples.

Figure 3:
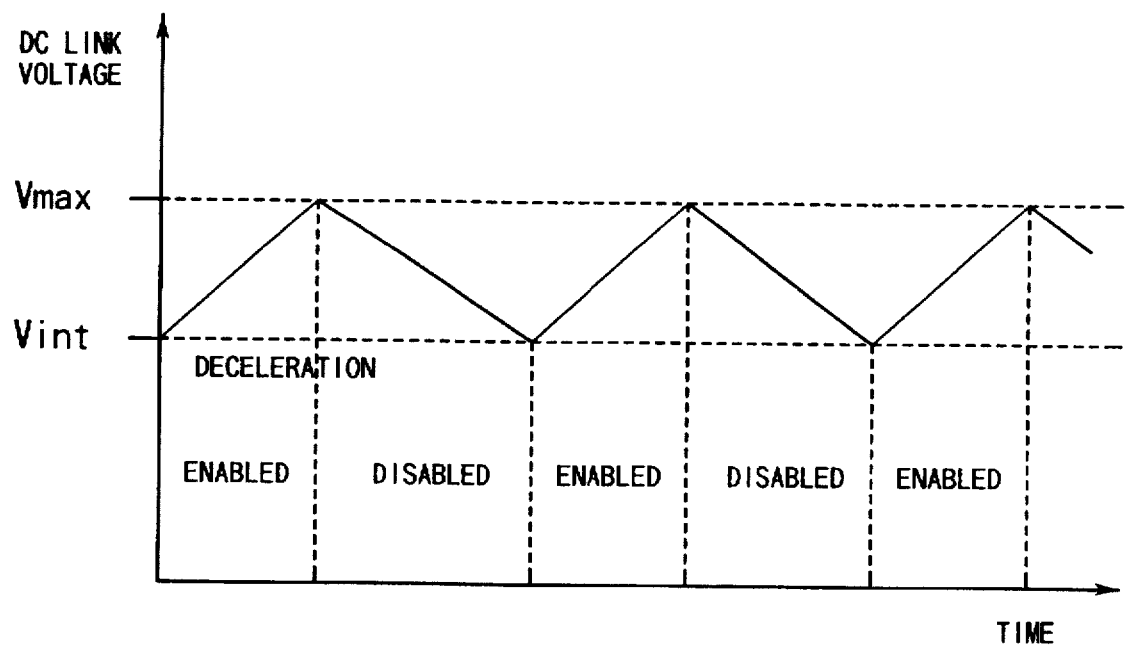
FIG. 3 is a diagram showing a first braking control method.

FIG. 3 is a diagram showing a first braking control method.

The first braking control method is a kind of on-off control in which the regenerative energy from the tool drive and workpiece drive motors is monitored and a braking control is applied to the motors intermittently not to let them regenerate energy greater than a predetermined threshold.

When such a braking control is applied, the tool drive and workpiece drive motors produce a certain amount of regenerative energy, and the produced regenerative energy is charged into the DC link via the amplifiers. Under normal conditions, the energy charged in the DC link is then returned to the AC power line via the power regeneration circuit.

If the AC power line has failed in the middle of machining a workpiece, the power regeneration circuit is first disabled, and at the same time, the numerical control brakes the tool drive motor and workpiece drive motor as well as energizing the tool feed motor to remove the tool from the workpiece. Assume here that the initial DC link voltage was $V_{ini}$ when the power regeneration began. In general, the regenerative energy from the tool drive motor is larger than the energy necessary for driving the tool feed motor, thus creating excess energy. Due to this excess energy, the DC link voltage will go up while the tool drive motor and workpiece drive motor decelerate. When the DC link voltage reaches a predetermined threshold, $V_{max}$, the braking control applied to the tool drive motor stops, and thus the corresponding amplifier stops returning the regenerative energy to the DC link. The DC link voltage decreases, since no new energy is regenerated while the deceleration is disabled and the energy existing in the DC link is solely spent by the tool feed motor. Even when the deceleration is disabled, the workpiece drive motor is still kept under the synchronization control by which it will rotate in phase with the tool drive motor.

When the DC link voltage falls down to the initial is voltage $V_{int}$, the braking control for the tool drive motor restarts. By repetitively enabling and disabling the deceleration as described above, the regenerative energy produced from the tool drive motor and workpiece drive motor can be regulated roughly to the energy level required for driving the tool feed motor.

Figure 4:
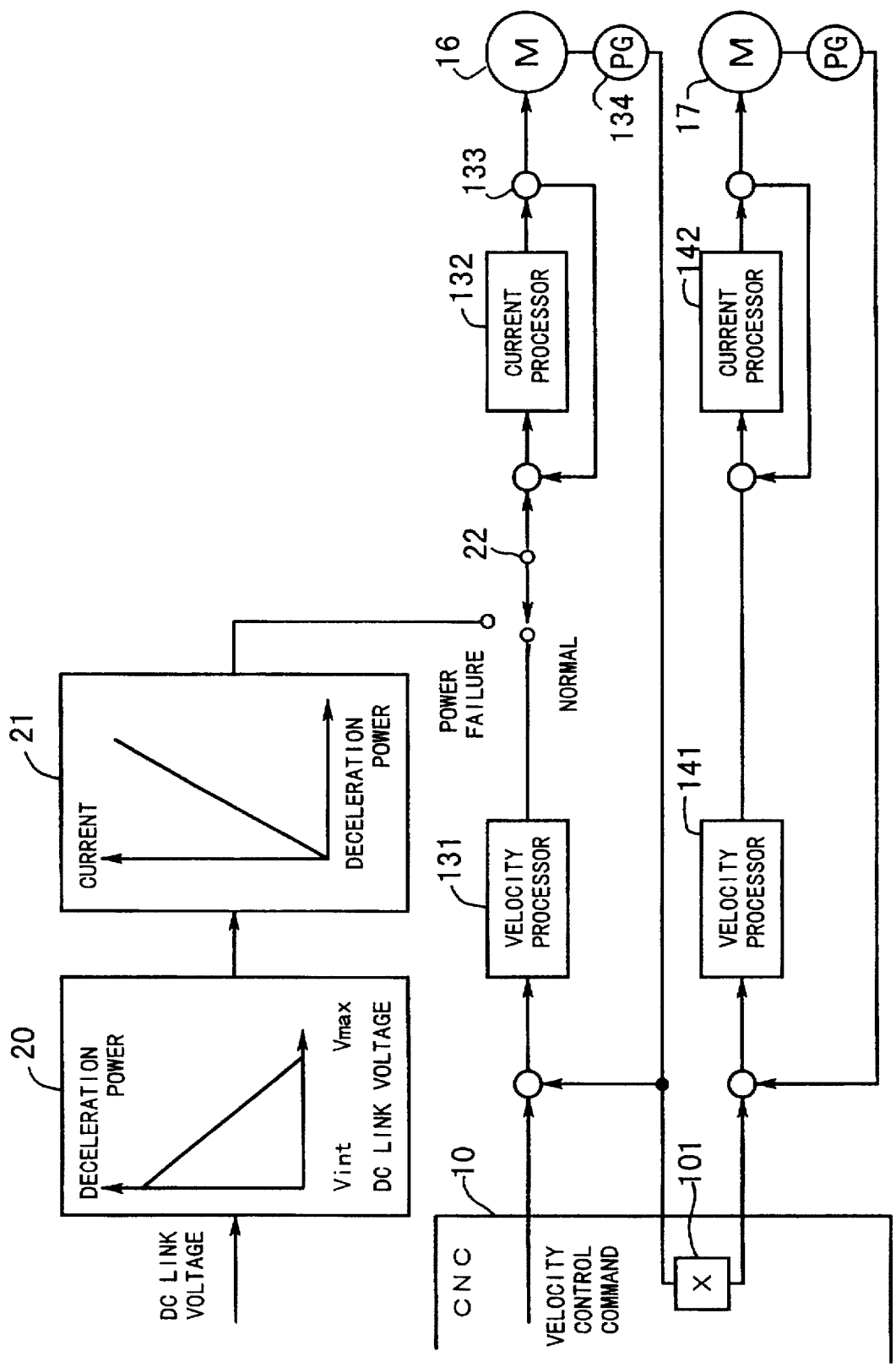
FIG. 4 is a diagram showing a second braking control method.

FIG. 4 is a diagram showing a second braking control method.

This second braking control method monitors the energy regenerated by the tool drive motor and workpiece drive motor and then controls the time for deceleration of those motors on a real-time basis in accordance with the change of the regenerative energy.

The amplifier for the tool drive motor 16 has a velocity processor 131 that receives velocity commands from the CNC 10 and a current (torque) processor 132 that receives the output of the velocity processor 131. A current detector 133 is disposed at the output of the current processor 132 to detect the output current. This output current signal is fed back to the input of the current processor 132, thus forming a current control loop. Similarly, a pulse generator 134 detects the rotational position of the tool drive motor 16 and the position detection signal is fed back to the input of the velocity processor 131, thus forming a velocity control loop. Likewise, the amplifier for the workpiece drive motor 17 has a velocity processor 141 and a current processor 142. It should be noted that velocity commands to the workpiece drive motor 17 are provided by a multiplier 101, which multiplies the pulse signals from the pulse generator 134 by a factor pertaining to the gear ratio. This configuration permits the workpiece drive motor 17 to be kept in synchronization with the tool drive motor 16.

FIG. 4 further shows a deceleration power command generator 20 which receives the DC link voltage, a current control command generator 21 which receives the output of the deceleration power command generator 20, and a switch 22 disposed at the input of the current processor 132 for the tool drive motor 16. The deceleration power command generator 20 issues deceleration power commands corresponding to the DC link voltage that ranges from the initial voltage $V_{int}$ to the maximum voltage $V_{max}$. The current control command generator 21 produces current control commands based on the deceleration power commands generated by the deceleration power command generator 20. The switch 22 provides the current processor 132 with current control commands, selecting those from the velocity processor 131 in normal operating conditions. In the case of power failure, the switch 22 changes its selection so that the commands from the current control command generator 21 be provided to the current processor 132.

When the AC power line is failed and if the regenerative energy produced by deceleration of the tool drive motor 16 and workpiece drive motor 17 exceeds the energy required for driving the tool feed motor, the DC link voltage will go up. As a counter operation against this increasing DC link voltage, the above-described structural arrangement controls the deceleration time on a real-time basis, according to a deceleration pattern that designates how the deceleration power should be reduced. This control is based on the nature that the regenerative energy decreases as the deceleration time increases. Accordingly, the regenerative energy produced from the tool drive motor 16 and workpiece drive motor 17 will be leveled with the energy required for driving the tool feed motor, thus resulting in no excess energy generated.

Figure 5:
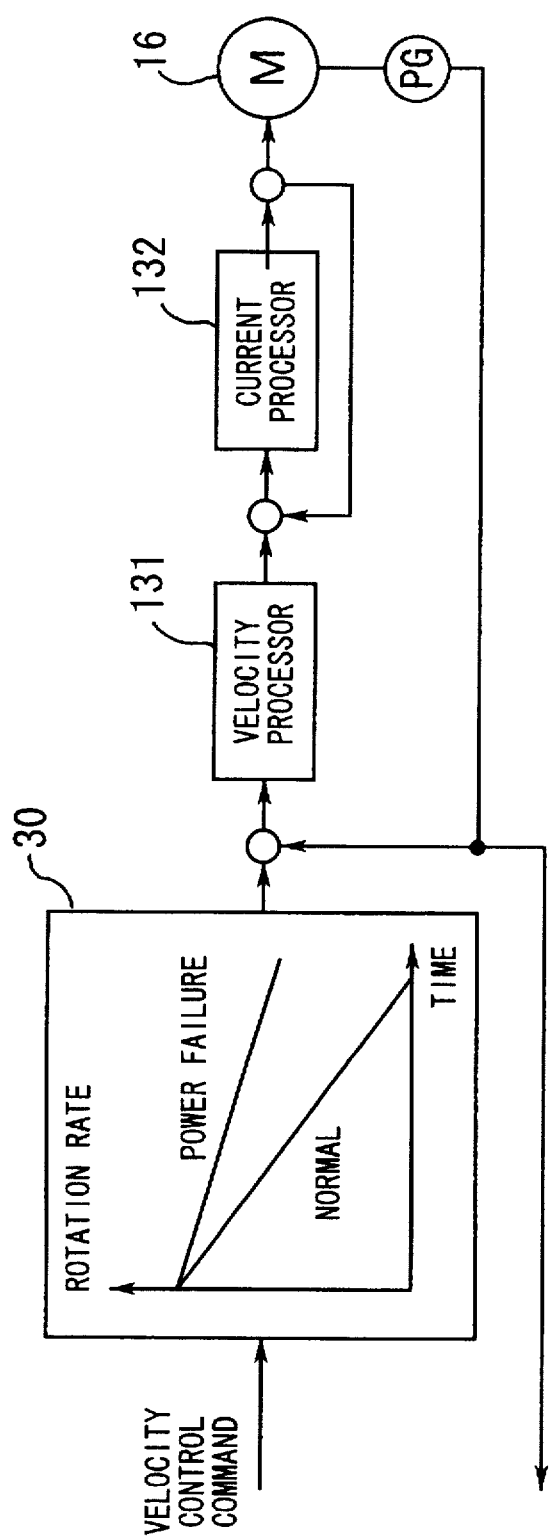
FIG. 5 is a diagram showing a third braking control method.
Figure 6:
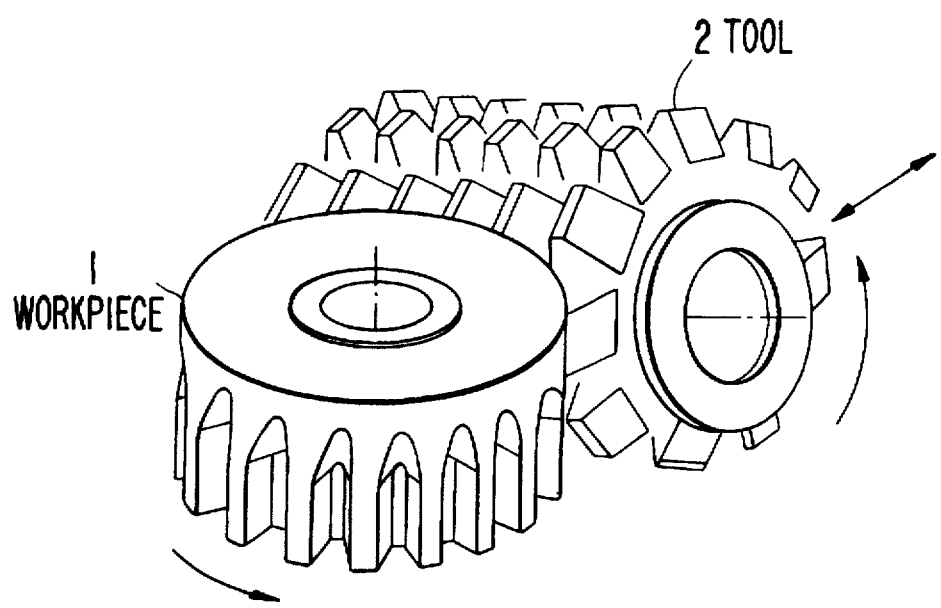
FIG. 6 is a perspective view showing a concept of machining in a hobbing machine.

FIG. 5 is a diagram showing a third braking control method.

In this third braking control method, the motors decelerate, when a power failure happened, according to a deceleration time that has been previously defined.

A deceleration pattern generator 30, disposed before the amplifier for the tool drive motor 16, has two deceleration patterns respectively prepared for normal and power failure conditions. The amplifier for the tool drive motor 16 contains the velocity processor 131 and current processor 132. A current control loop is formed by the current processor 132 and a feedback path from its output to input. Similarly, the velocity processor 131 serves as part of a velocity control loop, where the rotational position of the tool drive motor 16 is detected and fed back to the input of the velocity processor 131.

When deceleration is commanded under normal conditions, the tool drive motor 16 decelerates in a deceleration time according to the normal deceleration pattern selected in the deceleration pattern generator 30. The workpiece drive motor 17 naturally decelerates in synchronization with the tool drive motor 16. When the AC power is lost, the deceleration pattern generator 30 switches the deceleration pattern to one for the power failure condition, and therefore, the tool drive motor 16 slows down with a deceleration time pertaining to the newly selected pattern. Some trials should be conducted to obtain enough data for defining this deceleration pattern for the power failure condition in such a way that the regenerative energy produced in the tool drive motor 16 and workpiece drive motor 17 will be equal to the energy required for driving the tool feed motor.

As to the deceleration times pertaining to the deceleration patterns for normal conditions and power failure used in the deceleration pattern generator 30, it is also possible to set them as part of system parameters stored in the numerical control.

The above discussion will be summarized as follows. According to the present invention, the braking control for the tool drive motor and workpiece drive motor are conducted in such a manner that the regenerative energy produced therefrom will be equal to the energy required for driving the tool feed motor to retract the tool to a safe area. Since this braking control method causes no excess energy to be regenerated from the motors in deceleration, the machine is not required to have a discharge resistor unit for dissipation of the excess energy.

We claim:

1. A method of controlling, in a power failure, a machine in which a tool and a workpiece are numerically controlled in synchronization with each other, comprising the steps of:
disabling, in response to detection of a power failure, a power regeneration function in a power regeneration circuit disposed between a main power source and amplifiers for driving a tool drive motor, a workpiece drive motor, and a tool feed motor;

issuing a braking control command to decelerate the tool drive motor and the workpiece drive motor at such a deceleration rate that the tool drive motor and the workpiece drive motor will produce regenerative energy necessary for driving the tool feed motor, while maintaining synchronization thereof, the braking control command being produced by a numerical control whose power source is backed up with an uninterruptible power supply system; and retracting the tool to an area where the tool is not engaged with the workpiece, by driving the tool feed motor with the regenerative energy produced by deceleration of the tool drive motor and the workpiece drive motor.

2. A method according to claim 1, wherein said step of issuing the braking control command comprises the substeps of:

stopping the deceleration of the tool drive motor and the workpiece drive motor when the regenerative energy produced by the deceleration of the tool drive motor and the workpiece drive motor becomes equal to or greater than a first predetermined value, and restarting the deceleration of the tool drive motor and the workpiece drive motor when the regenerative energy produced by the deceleration of the tool drive motor and the workpiece drive motor becomes less than or equal to a second predetermined value which is less than the first predetermined value.

3. A method according to claim 2, wherein said second predetermined value is a DC link voltage when the tool drive motor and the workpiece drive motor began regeneration.

4. A method according to claim 1, wherein said step of issuing the braking control command comprises the substeps of:

designating a deceleration power based on the regenerative energy produced by the deceleration of the tool drive motor and the workpiece drive motor, issuing a current control command corresponding to the deceleration power that is designated, and applying the current control command to a current processor for the tool drive motor.

5. A method according to claim 1, wherein said step of issuing a braking control command decelerates the tool drive motor and the workpiece drive motor according to a deceleration pattern prepared for the power failure.

6. An apparatus for controlling, in a power failure, a machine in which a tool and a workpiece are numerically controlled in synchronization with each other, the apparatus comprising:

a power failure detector for detecting a failure of an AC power source and sending a power failure detection signal;

a numerical control, coupled to a workpiece drive motor, a tool drive motor, and a tool feed motor, for controlling deceleration of the workpiece drive motor and the tool drive motor, in response to the power failure detection signal sent from said power failure detector, in such a way that regenerative energy produced by the deceleration will be equal to energy required for driving the tool feed motor, and for retracting the tool to an area where the tool is not engaged with the workpiece, by driving the tool feed motor with the regenerative energy produced by the deceleration; and a power regeneration circuit having functions of converting electricity supplied from the AC power source to a DC voltage, converting the regenerative energy produced by the deceleration, and returning the converted regenerative energy to the AC power source, said function of converting the regenerative energy being stopped when the power failure detection signal arrived from said power failure detector.

7. An apparatus according to claim 6, wherein said numerical control is backed up by an uninterruptible power supply system.

8. An apparatus according to claim 6, wherein the machine, in which the tool and the workpiece are numerically controlled in synchronization with each other, is a gear cutting machine.

9. An apparatus according to claim 6, wherein the machine, in which the tool and the workpiece are numerically controlled in synchronization with each other, is a gear grinding machine.

* * * * *